United States Patent [19]

Ishiwata et al.

[11] Patent Number: 5,127,316

[45] Date of Patent: Jul. 7, 1992

[54] PUMP APPARATUS WITH IMPROVED COUPLING BETWEEN THE PUMP AND MOTOR

[75] Inventors: Ichiro Ishiwata, Yokosuka; Hiroshi Ohkuma, Yokohama, both of Japan

[73] Assignee: Nippon Air Brake Co., Ltd., Hyogo, Japan

[21] Appl. No.: 711,295

[22] Filed: Jun. 6, 1991

[30] Foreign Application Priority Data

Jun. 12, 1990 [JP] Japan ................ 2-62097[U]

[51] Int. Cl.$^5$ .............................................. F01B 1/00
[52] U.S. Cl. .................................. 92/72; 92/129; 464/89; 403/225; 403/383
[58] Field of Search .............. 92/72, 129; 464/87, 464/89, 92; 403/225, 383

[56] References Cited

U.S. PATENT DOCUMENTS

| | | | |
|---|---|---|---|
| 3,096,106 | 7/1963 | Wanner | 464/89 |
| 3,473,406 | 10/1969 | Runkle | 464/87 |
| 3,612,728 | 10/1971 | Fulmer | 417/415 |
| 3,955,905 | 5/1976 | Frommholtz et al. | 464/89 |
| 4,130,002 | 12/1978 | Katz | 403/325 |
| 4,586,845 | 5/1986 | Morris | 403/383 |
| 4,623,278 | 11/1986 | Merrell | 403/383 |
| 4,714,371 | 12/1987 | Cuse | 403/383 |

FOREIGN PATENT DOCUMENTS

| | | | |
|---|---|---|---|
| 0076550 | 6/1977 | Japan | 403/383 |
| 0318745 | 1/1972 | U.S.S.R. | 464/89 |
| 0572602 | 9/1977 | U.S.S.R. | 464/89 |

*Primary Examiner*—Thomas E. Denion
*Attorney, Agent, or Firm*—Kane, Dalsimer, Sullivan, Kurucz, Levy, Eisele and Richard

[57] ABSTRACT

A pump apparatus includes a plunger, an eccentric cam for moving the plunger toward a pressure chamber, a drive shaft supporting the eccentric cam, and an output shaft of a motor for imparting a rotational force to the drive shaft. A convex portion is formed on one end of one of the drive shaft and the output shaft whereas a concave portion is formed in one end of the other of the two shafts. The convex portion is fitted in the concave portion to interconnect the drive shaft and the output shaft. The convex portion is fitted in the concave portion with a clearance therebetween. A holder member for always holding the convex portion and the concave portion in engagement with each other in the direction of rotation of the drive shaft is provided at an area of fitting between the convex portion and the concave portion. With this arrangement, noises resulting from the impingement of one of the convex portion and the concave portion upon the other during the operation of the pump apparatus are eliminated.

9 Claims, 3 Drawing Sheets

PUMP APPARATUS WITH IMPROVED COUPLING BETWEEN THE PUMP AND MOTOR

BACKGROUND OF THE INVENTION

This invention relates to a pump apparatus used, for example, in a hydraulic brake system of a vehicle, and more particularly to a technique of reducing noises and vibrations produced by the operation of a pump.

Generally, a conventional pump apparatus of this type comprises a plunger whose one end portion is fitted in a cylinder bore, formed in a body, to form, together with this cylinder bore, a pressure chamber, an eccentric cam provided adjacent to the other end of the plunger so as to move the plunger toward the pressure chamber, a drive shaft which supports the eccentric cam and extends in a direction intersecting the axis of the plunger, and an output shaft of a motor for imparting a rotational force to the drive shaft. Connection between the drive shaft and the output shaft is made by the fitting of a convex portion in a concave portion, the convex portion being formed on one end of one of the drive shaft and the output shaft whereas the concave portion is formed in one end of the other. Both a pump apparatus with one plunger and a dual-type pump apparatus with two plungers have such a construction. The former is disclosed in Japanese Utility Model Publication No. 24375/80 (corresponding to U.S. Pat. No. 3,612,728), and the latter is disclosed in Japanese Laid-Open (Kokai) Utility Model Application No. 19079/89.

In such a pump apparatus, to facilitate the connection between the drive shaft and the output shaft, or to facilitate the attachment of the motor to the pump, it is desirable that the convex portion and the concave portion, provided respectively at the ends of the drive shaft and the output shaft, should be fittingly engaged with each other with clearances therebetween. Such a clearance provided at each side of the convex portion is, for example, about 0.1 to 0.15 mm.

However, when such clearances are provided, it has been found that the convex portion and the concave portion are not always held in contact with each other in the direction of the periphery of the two shafts, which causes noises and vibrations. More specifically, when the rotational force is varied due to the activation of the motor or the pumping action, the position of the convex and concave portions relative to each other in the peripheral direction is changed, so that the convex and concave portions are brought into contact or out of contact with each other. As a result, noises and vibrations are produced when the convex and concave portions impinge upon each other.

Such noises and vibrations are undesirable from the viewpoint of the durability of the pump apparatus, and besides when the pump apparatus is mounted on a vehicle, such noises and vibrations cause the driver to feel uncomfortable when the sound generated from the vehicle is at a low level, as during the idling of the engine.

SUMMARY OF THE INVENTION

It is therefore an object of this invention to provide a pump apparatus which can effectively reduce noises and vibrations, resulting from the impingement of the above convex and concave portions upon each other, without affecting the attachment of the convex portion to the concave portion.

According to the present invention there is provided a pump apparatus comprising a plunger whose one end portion is fitted in a cylinder bore, formed in a body, to form, together with the cylinder bore, a pressure chamber; an eccentric cam provided adjacent to the other end of the plunger so as to move the plunger toward the pressure chamber; a drive shaft supporting the eccentric cam and extending in a direction intersecting an axis of the plunger; and an output shaft of a motor for imparting a rotational force to the drive shaft, a convex portion being formed on one end of one of the drive shaft and the output shaft whereas a concave portion is formed in one end of the other of the two shafts, and the convex portion being fitted in the concave portion to interconnect the drive shaft and the output shaft; wherein the convex portion is fitted in the concave portion with a clearance therebetween; and a holder member for always holding the convex portion and the concave portion in engagement with each other in the direction of rotation of the drive shaft is provided at an area of fitting between the convex portion and the concave portion.

DESCRIPTION OF THE PREFERRED EMBODIMENTS OF THE INVENTION

Figure 1:
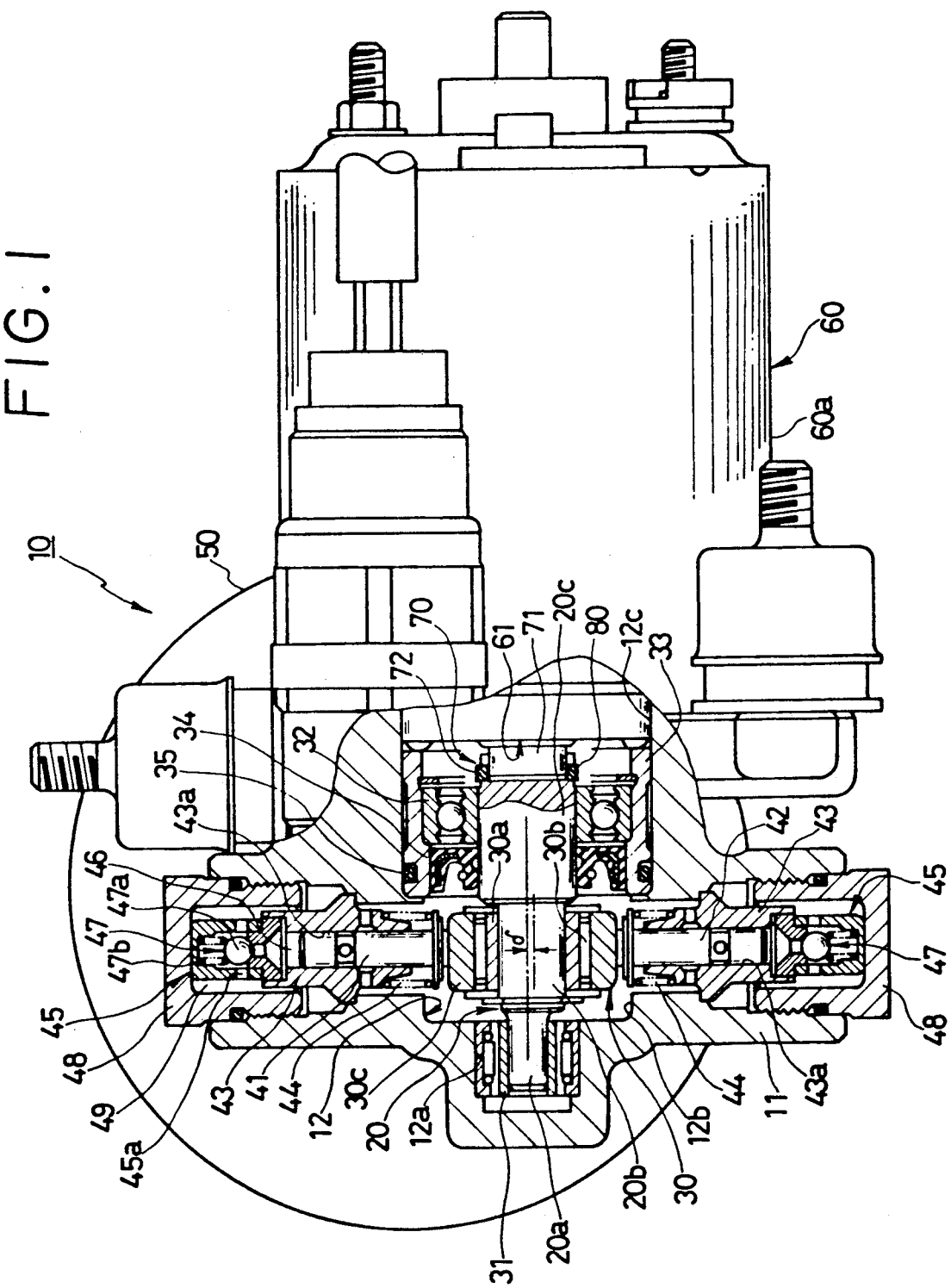
FIG. 1 is a view showing the overall construction of a preferred embodiment of the present invention.

FIG. 1 is a partly cross-sectional, elevational view of the overall construction of a pump apparatus of the dual type used as an external pressure source for a hydraulic booster of a vehicle.

The pump apparatus 10 includes a body 11 in which a hole 12 receiving a drive shaft 20 is formed. The hole 12 is closed at one end, and is open at the other end. The hole 12 has a smaller-diameter portion 12a, an intermediate-diameter portion 12b and a larger-diameter portion 12c which are sequentially arranged in this order from the closed end of the hole 12. In conformance with the hole 12, the drive shaft 20 also has a smaller-diameter portion 20a, an intermediate-diameter portion 20b and a larger-diameter portion 20c. Among these three portions of the drive shaft 20, the smaller-diameter portion 20a and the larger-diameter portion 20c have a common axis, but the axis of the intermediate-diameter portion 20b is eccentric a predetermined distance $\delta$ from this common axis. A ring-shaped eccentric cam 30 is supported on the outer periphery of the eccentric intermediate-diameter portion 20b. The eccentric cam 30 comprises an inner race 30a, a bearing 30b and an outer race 30c, and is rotatable about the intermediate-diameter portion 20b.

The drive shaft 20, supporting the eccentric cam 30, is rotatably supported by first and second radial bearings 31 and 32 which respectively bear the opposite end portions thereof, that is, the smaller-diameter portion 20a and the larger-diameter portion 20c. The first radial bearing 31 is disposed in the smaller-diameter portion 12a of the hole 12, and the second radial bearing 32 is received in a bearing guide 33 mounted in the larger-diameter portion 12c of the hole 12. An oil seal 34 and an O-ring 35 are mounted respectively on the inner and outer peripheries of the bearing guide 33, and form a seal between the inner side (i.e., the smaller-diameter portion 12a and the intermediate-diameter portion 12b) of the hole 12 and the open end of the hole 12c at the larger-diameter portion 12c. The thus sealed inner side of the hole 12 is connected to a reservoir (not shown) so as to receive an operating fluid therefrom.

A pair of first and second plungers 41 and 42 extend in a direction perpendicular to the axis of the hole 12 and the drive shaft 20. The two plungers 41 and 42 are spaced 180° from each other in the direction of the circumference of the drive shaft 20. The neighboring parts of the plunger 41 are identical respectively to the neighboring parts of the plunger 42. Therefore, the neighboring parts of the first plunger 41 will be explained, and explanation of the neighboring parts of the second plunger 42 designated by the same reference numerals will be omitted.

One end portion of the plunger 41 is fitted in an internal bore (cylinder bore) 43a of a cylinder member 43, and the other end face of the plunger 41 is abutted against the outer race 30c of the eccentric cam 30. With this arrangement, in response to the rotation of the drive shaft 20, the plunger 41 is reciprocally moved linearly a distance twice the amount δ of eccentricity of the eccentric cam 30. A spring 44, urging the plunger 41 toward the eccentric cam 30, always holds the plunger 41 in contact with the eccentric cam 30 during the reciprocal movement of the plunger 41. The cylinder member 43 defines, together with the plunger 41 and part of a valve housing 45, a pressure chamber 46 adjacent to one end of the plunger 41. The valve housing 45 is a housing for a check valve 47. A ball 47a, which constitutes the check valve 47, and a valve spring 47b are accommodated within the valve housing 45. The valve housing 45 is supported, together with the cylinder member 43, by a cap member 48 threadedly connected to the body 11. A chamber 49 is formed between the outer side of the valve housing 45 and the inner side of the cap member 48. The chamber 49 is communicated with the interior of the valve housing 45 via a passage 45a, and is also communicated with an accumulator 50 and a discharge port of the pump apparatus 10 via a passage (not shown) formed in the body 11. Therefore, a fluid pressure, produced in the pressure chamber 46 by the reciprocal movement of the plunger 41, flows through the check valve 47 and the passage 45a into the chamber 49, and is stored in the accumulator 50, and is used as a pressure source for the hydraulic booster mounted outside of the pump apparatus. The first and second plungers 41 and 42 are 180° out of phase with each other with respect to the phase of the eccentric cam 30, and therefore for example, when one plunger 41 is in a position to start the compression stroke as shown in FIG. 1, the other plunger 42 is in a position to start the induction stroke.

The drive shaft 20 receives a rotational force from a output shaft 61 of a motor 60, and is rotated by this rotational force. The transmission of the rotational force from the output shaft 61 of the motor 60 to the drive shaft 20 is carried out through a convex-concave fitting portion 70. At this convex-concave fitting portion 70, a convex portion (projection) 71 formed on the end of one of the drive shaft 20 and the output shaft 61 is fitted in a concave portion (recess) 72 formed in the end of the other. In the pump apparatus 10 shown in FIG. 1, the motor 60 is mounted in a horizontal direction, and the axis of the output shaft 61 is aligned with the axis of the drive shaft 20. The concave portion 72 is formed in the end face of the larger-diameter portion 20c of the drive shaft 20, and extends radially of the drive shaft 20 in a direction perpendicular to the axis of the drive shaft 20. The convex portion 71 of an elongated rectangular cross-section is formed on the end of the output shaft 61 of the motor 60 facing the drive shaft 20. The convex portion 71 is inserted in the concave portion 72. In this case, the motor 60 is an electric motor of the type in which a rotor having the output shaft 61 is accommodated within a casing 60a. The motor 60 is attached to the body 11, with part of the casing 60a received in the larger-diameter portion 12c of the hole 12.

In view of the easiness of assembling, small clearances are provided between the convex portion 71 and the concave portion 72. In the present invention, despite the provision of such clearances, two sections 71a and 71b of the convex portion 71 spaced from each other around the axis of the convex portion 71 are always held in contact with corresponding wall surfaces of the concave portion 72, respectively. Namely, the two sections 71a and 71b are always held in contact with the concave portion 72 in the direction of rotation of the drive shaft 20 and the output shaft 61, thereby preventing the convex and concave portions 71 and 72 from impinging upon each other with an impact.

As means for engaging or contacting the two sections 71a and 71b of the convex portion 71 with the concave portion 72, there is provided a holder member at the area of fitting between the convex portion 71 and the concave portion 72 so as to rotate them relative to each other about the axis thereof.

The concave portion 72 has an opening 72A in which the convex portion 71 fits with the clearances, and a groove 72D which is disposed deeper than the opening 72A and is wider than the opening 72A. The opening 72A and the groove 72D have a common center. The opening 72A as well as the groove 72D extends diametrically of the drive shaft 20, and are open at its opposite ends to the outer peripheral surface of the drive shaft 20. The holder member is inserted into the wider groove 72D in the radial direction of the drive shaft 20.

Preferably, the holder member should be made of a material (e.g. rubber or plastics material) capable of slight elastic deformation. By doing so, the transmission of an impact force due to the reaction force can be alleviated.

Figure 2:
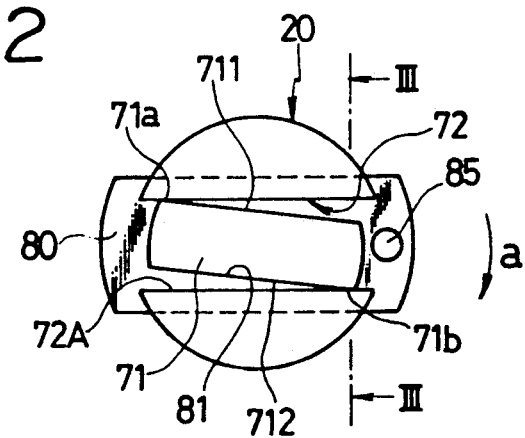
FIG. 2 is a view showing the connection between a drive shaft and an output shaft of a motor.
Figure 3:
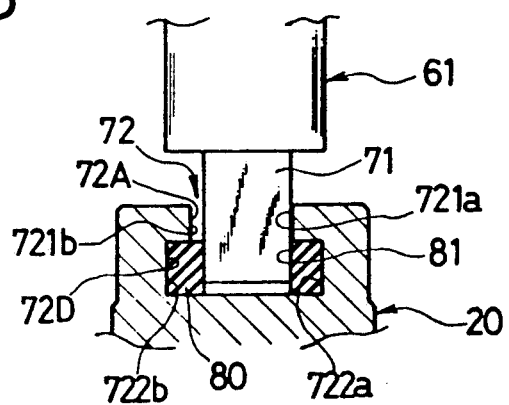
FIG. 3 is a cross-sectional view taken along the line III—III of FIG. 2.

Next, a preferred form of the holder member will now be described with reference to FIGS. 2 and 3.

Figure 4:
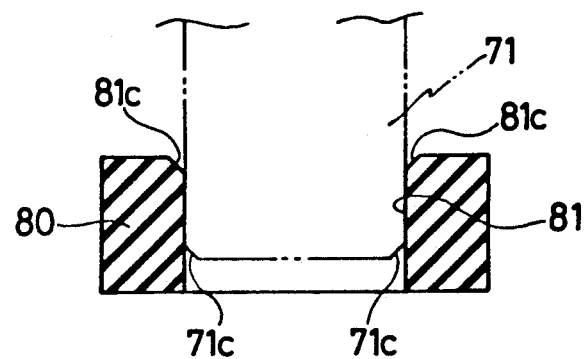
FIG. 4 is an enlarged cross-sectional view of a holder member.

The holder member 80 is in the form of a plate made of a high-hardness rubber material, such as an ethylene-propylene terpolymer having a Shore hardness of about 80. The plate 80 is of such a size that it can be tightly fitted in the wider groove 72D of the concave portion 72 of a two-step construction formed at the end of the drive shaft 20. The plate 80 has a hole 81 formed therethrough its central portion and extending from its front face to its rear face. The hole 81 has a shape corresponding or complementary to the outer shape of the convex portion 71, and the convex portion 71 is pressfitted in the hole 81 when the output shaft 61 including the convex portion 71 is connected to the drive shaft 20 including the concave portion 72. The plate 80 can be slightly deformed elastically, and therefore the convex portion 71 can be pressfitted into the hole 81, utilizing this deformation. Preferably, to facilitate this press-fitting, the peripheral edge of the hole 81 should be slightly chamfered as at 81c, and also the peripheral edge of the distal end of the convex portion 71 should be slightly chamfered as at 71c (see FIG. 4).

The convex portion 71 has parallel opposite side walls 711 and 712, and the concave portion 72 has parallel opposed side walls 721a and 721b and parallel opposed side walls 722a and 722b. The convex portion 71 and the concave portion 72 are slightly spaced from each other because of the predetermined clearances provided therebetween. However, since the hole 81 is inclined by an amount equal to these predetermined clearances, the two sections 71a and 71b of the convex portion 71 are engaged with the side walls 721a and 721b of the concave portion 72, respectively. The direction of rotation of the output shaft 61 including the convex portion 71, as well as the direction of rotation of the drive shaft 20 including the concave portion 72, is shown by arrow a in FIG. 2. The two sections 71a and 71b of the convex portion 71 are engaged with the concave portion 72 in the direction of rotation thereof. Therefore, when the two shafts 61 and 20 rotate, the convex portion 71 is always held in predetermined positional relation to the concave portion 72, and an engagement-disengagement variation will not occur. Therefore, the production of noises and vibrations due to this variation is restrained. Here, it is important that the convex portion 71 and the concave portion 72 should be engaged with each other in the direction of rotation thereof. For this reason, in order to clearly distinguish between the front and rear faces of the plate 80 so as to obtain an effective engagement between the convex portion 71 and the concave portion 72, a projection 85 is formed on one face of the plate 80. The means for distinguishing between the front and rear faces of the plate 80 may comprise a suitable mark such as a character and a sign, instead of the projection 85.

In view of the fact that the reaction force transmitted from the pressure chamber 46 is abruptly increased when the plunger starts the compression stroke, the convex portion 71 is preferably so positioned as to move along the concave portion 72 when the plunger is in the position to start the compression stroke so that the plunger can have a degree of freedom in its axial direction. By doing so, noises and vibrations can be further reduced.

To reduce the reaction force from the pressure chamber is also effective for reducing noises and vibrations of the pump apparatus. During the operation of the pump apparatus, each time an inlet valve around the plunger is closed, the liquid pressure within the pressure chamber is abruptly increased. This abrupt liquid pressure increase is applied as an impact force to the eccentric cam, the drive shaft and the output shaft of the motor via the plunger. Several methods of reducing such impactive reaction force will be described below. Greater effects can be obtained by a suitable combination of such methods.

Figure 5:
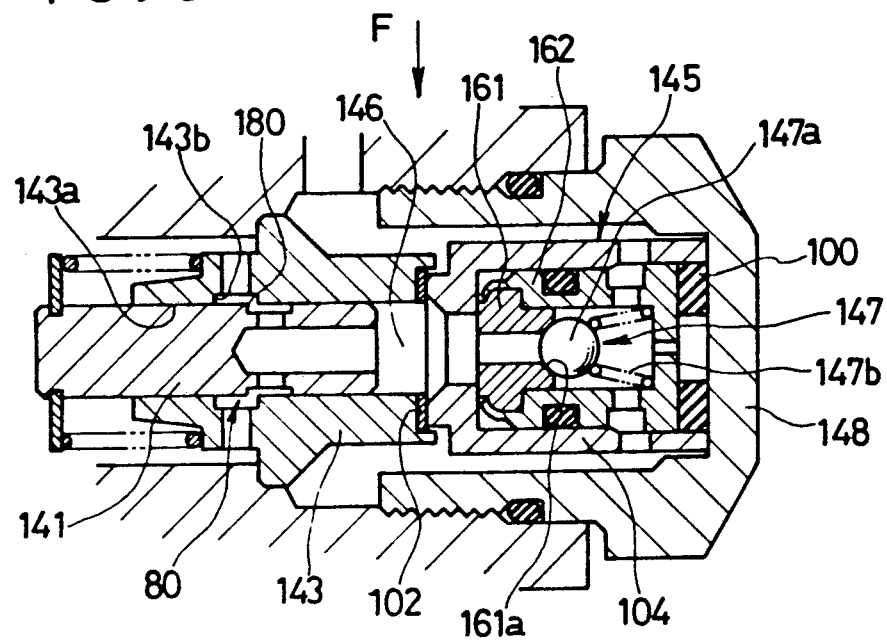
FIG. 5 is a cross-sectional view of an important portion, showing a noise prevention means applicable to the present invention.

First, as shown in FIG. 5, one method is to support one end of a valve housing 145 of a check valve 147 by an elastic member such as a ring-shaped rubber spring 100. A sleeve 104 is connected to one end of a cylinder member 143 (which guides a plunger 141) via a gasket 102 interposed therebetween. The sleeve 104 is integrally supported relative to the cylinder member 143 by the force of a threaded connection of a cap member 148. The valve housing 145 of the check valve 147 and the rubber spring 100 are received within the sleeve 104. The rubber spring 100 is disposed between the valve housing 145 and the cap member 148, and alleviates an abrupt force which the valve housing 145 receives from a pressure chamber 146. The valve housing 145 comprises a seat member 161 having a valve seat 161a at one end, and a housing body 162 of a shuttle-shape. The housing body 162 and the seat member 161 are integrally connected together by compressive deformation. The check valve 147 within the valve housing 145 comprises a ball 147a which can seat on the valve seat 161a, and a valve spring 147b urging the ball 147a toward the valve seat 161a.

Figure 6:
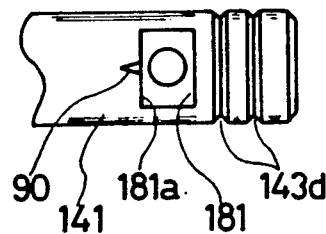
FIG. 6(A) is a view of a portion of a plunger as seen from arrow F of FIG. 5, showing another example of noise prevention means.
FIG. 6(B) is a view showing that portion of the plunger of FIG. 6(A) including a recess.
Figure 6:
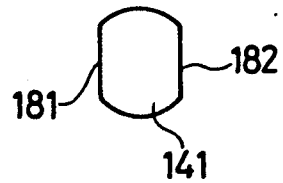

Another method of effectively reducing noises is to divide an inlet valve, disposed around the plunger, in the peripheral direction. The check valve 47, 147 is provided at the outlet side of the pressure chamber 46, 146 whereas the inlet valve 80 in the form of a spool valve utilizing the movement of the plunger is usually provided at the inlet side. The inlet valve 80 is opened by a communication between a groove 143b, formed in the inner peripheral surface of a cylinder bore 143a, and a recess 180 formed in the outer peripheral surface of the plunger 141, and is closed by interrupting this communication (see FIG. 5). Usually, the groove 143b and the recess 180 are annular around the entire periphery. In such a case, when the recess 180 of the plunger 141 goes past a stepped portion of the groove 143b of the cylinder bore 143a, the operating liquid tends to flow or return from the recess 180 into a small gap between the plunger 141 and the cylinder bore 143a. The impact caused by this return liquid is vigorous, and therefore tends to produce abnormal noises. To avoid such noises, it is effective to divide at least one of the groove 143b and the recess 180 in the direction of the periphery thereof. In an example shown in FIG. 6, the recess is divided into two sections 181 and 182 in the direction of the circumference or periphery of the plunger 141. In FIG. 6, two grooves 143d of a V-shaped cross-section are formed in the outer periphery of the plunger 141 adjacent to one end thereof close to the pressure chamber. The two grooves 143d serve as oil sumps for holding lubricating oil. A notch 90 of a triangular shape is formed in a central section of a stepped portion 181a which is remote from the pressure chamber and defines one side of the recess 181. This notch 90 is also provided to alleviate an abrupt pressure increase of the liquid in the pressure chamber.

Although the distal end of the convex portion 71 is shown in the drawings as being out of contact with the bottom of the concave portion 72, the distal end of the convex portion 71 may be in contact with the bottom of the concave portion 72.

The present invention can also be applied to a pump apparatus of the dual type in which two plungers are arranged in parallel relation to each other, and to a pump apparatus having one plunger.

In the present invention, the clearances are provided at the area of fitting between the convex portion 71 and the concave portion which cooperate with each other to transmit the rotational force, and therefore the assembling can be carried out easily. Further, the holder member 80 provided at the fitting area always holds the convex portion 71 and the concave portion in engagement with each other in the direction of rotation. Therefore, noises and vibrations caused by the engagement and disengagement can be effectively reduced.

What is claimed is:

1. In a pump apparatus comprising a plunger whose one end portion is fitted in a cylinder bore, formed in a body, to form, together with said cylinder bore, a pressure chamber; an eccentric cam provided adjacent to the other end of said plunger so as to move said plunger toward said pressure chamber; a drive shaft supporting said eccentric cam and extending in a direction intersecting an axis of said plunger; and output shaft of a motor for imparting a rotational force to said drive shaft, a convex portion being formed on one end of one of said drive shaft and said output shaft whereas a concave portion is formed in one end of the other of said two shafts, and said convex portion being fitted in said concave portion to interconnect said drive shaft and said output shaft;

the improvement wherein said convex portion is fitted in said concave portion with a clearance therebetween; and a holder member for always holding said convex portion and said concave portion in engagement with each other in the direction of rotation of said drive shaft is provided at an area of fitting between said convex portion and said concave portion, said convex portion having a pair of parallel opposite side walls, said concave portion having a pair of parallel opposed side walls, said holder member being in the form of a plate made of an elastic material, said holder member being supported by said concave portion, said plate having a central hole complementary in shape to said convex portion, said convex portion being fitted in said central hole, and said opposite side walls of said convex portion intersecting said opposed side walls of said concave portion, respectively.

2. A pump apparatus according to claim 1, in which a peripheral edge of said central hole receiving said convex portion is chamfered.

3. A pump apparatus according to claim 1, in which said convex portion is formed on the one end of said output shaft of said motor whereas said concave portion is formed in the one end of said drive shaft, said concave portion having an opening in which said convex portion is fitted with the clearance, and a groove which is provided deeper than said opening and is wider than said opening, and said opening and said groove having a common center.

4. A pump apparatus according to claim 3, in which said holder member is received in said groove.

5. A pump apparatus according to claim 3, in which said opening, a well as said groove, extends diametrically of said drive shaft, and are open at its opposite ends to the outer peripheral surface of said drive shaft.

6. A pump apparatus according to claim 1, in which means for distinguishing between front and rear faces of said holder member is provided on one of said front and rear faces.

7. A pump apparatus according to claim 1, in which when said plunger starts a compression stroke, said opposite side walls of said convex portion and said opposed side walls of said concave portion are disposed generally parallel to the axis of said plunger.

8. A pump apparatus according to claim 1, in which said holder member is made of a high-hardness material, so that a force can be substantially rigidly transmitted between said output shaft of said motor and said drive shaft, and that a reaction force transmitted from said pressure chamber can be alleviated.

9. A pump apparatus according to claim 1, in which said drive shaft has a smaller-diameter portion, an intermediate-diameter portion and a larger-diameter portion, said eccentric cam being supported on said intermediate-diameter portion, one end of said larger-diameter portion being connected to said output shaft, and said drive shaft being rotatably borne at said smaller-diameter portion and said larger-diameter portion.

* * * * *